United States Patent [19]
Evans et al.

[11] Patent Number: 5,640,683
[45] Date of Patent: Jun. 17, 1997

[54] MODULATED BACKSCATTER WIRELESS COMMUNICATION SYSTEM HAVING AN EXTENDED RANGE

[75] Inventors: James Gifford Evans, Colts Neck; R. Anthony Shober, Red Bank; Giovanni Vannucci, Middletown Township, Monmouth County; Stephen A. Wilkus, Lincroft, all of N.J.

[73] Assignee: NCR Corporation, Dayton, Ohio

[21] Appl. No.: 504,188

[22] Filed: Jul. 17, 1995

Related U.S. Application Data

[63] Continuation of Ser. No. 206,075, Mar. 4, 1994, abandoned.

[51] Int. Cl.$^6$ ............................................... H04B 7/00
[52] U.S. Cl. ................... 455/45; 455/63; 455/73; 455/106
[58] Field of Search ...................... 455/45, 63, 73, 455/104, 106, 266, 307, 41, 42; 340/825.54; 342/50, 51

[56] References Cited

U.S. PATENT DOCUMENTS

| | | | |
|---|---|---|---|
| 4,075,632 | 2/1978 | Baldwin et al. | 343/6.8 |
| 4,517,562 | 5/1985 | Martinez | 455/45 |
| 4,739,328 | 4/1988 | Koelle et al. | 342/44 |
| 4,761,829 | 8/1988 | Lynk, Jr. et al. | 455/307 |
| 4,786,907 | 11/1988 | Koelle | 342/51 |
| 4,888,591 | 12/1989 | Landt et al. | 342/44 |
| 4,926,187 | 5/1990 | Sugawara et al. | 342/361 |
| 5,030,807 | 7/1991 | Landt et al. | 342/44 |
| 5,140,701 | 8/1992 | Zaks | 455/307 |
| 5,166,676 | 11/1992 | Milheiser | 340/825.54 |
| 5,201,060 | 4/1993 | Haruyama et al. | 455/45 |
| 5,252,979 | 10/1993 | Nysen | 455/73 |
| 5,270,717 | 12/1993 | Schuermann | 342/22 |

*Primary Examiner*—Reinhard J. Eisenzopf
*Assistant Examiner*—Thanh Le
*Attorney, Agent, or Firm*—John A. Caccuro; Frederick B. Luludis

[57] ABSTRACT

A modulated backscatter communication system (e.g., an Electronic Shelf Label (ESL) system) includes a central node (e.g., a ceiling node) and one or more remote nodes (e.g., ESL tags). The central node transmits a downlink radio signal which is reflectively modulated at a remote node to produce a modulated reflected radio signal. At the remote node, a precise-frequency subcarrier signal is modulated with an uplink information signal to produce a modulated signal which is used to produce the modulated reflected radio signal. At the central node, the modulated reflected radio signal is received, detected and narrowband filtered to obtain the modulated subcarrier signal which is then demodulated to obtain the uplink information signal, with great immunity to close to carrier downlink radio noise and fluorescent light backscatter interference.

20 Claims, 2 Drawing Sheets

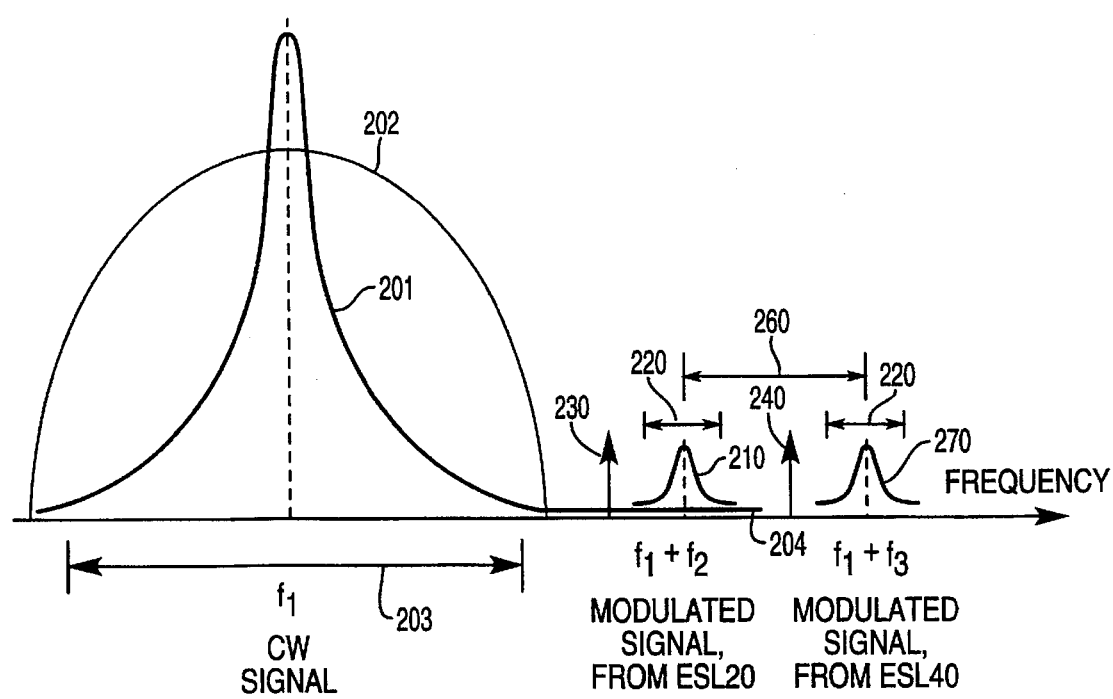

# 5,640,683

MODULATED BACKSCATTER WIRELESS COMMUNICATION SYSTEM HAVING AN EXTENDED RANGE

This application is a continuation if application Ser. No. 08/206,075, filed on Mar. 4, 1994, now abandoned.

Field of the Invention

This invention relates to wireless communication systems and, more particularly, to a wireless communication system using modulated backscatter technology.

BACKGROUND OF THE INVENTION

A variety of wireless communication technologies are now being utilized in Electronic Shelf Label (ESL) systems to convey pricing information of the items for sale in a supermarket. These systems are arranged to electronically change the price on ESL tags to replace the time-consuming process of changing prices on paper labels. The price displayed on the ESL tags is updated using a highly reliable "downlink" communications path from the ESL system controller to the ESL tag to assure that the price displayed on the ESL tag is identical to the price stored in the supermarket's computer database. This communication path is called the "downlink" because it typically originates from a centralized unit mounted in the ceiling (ceiling node). To minimize pricing errors, such ESL systems must have a positive assurance that each ESL tag received a particular price change message. The ESL tags transmit a positive acknowledgement over an "uplink" communication path to the ceiling node. Not only is it essential for the uplink to be reliable, but for ESL systems to be cost-effective, ESL tags must be very inexpensive and the supermarket infrastructure cost (the quantity and cost of the ceiling nodes) must be kept to a minimum. Thus, a problem exists to develop a reliable uplink communication path for an ESL system that is inexpensive yet has as great a communication range as possible.

SUMMARY OF THE INVENTION

In accordance with the present invention, a communication system (e.g., an ESL system) improves the uplink communication range, illustratively for an ESL tag, by sending a Continuous-Wave (CW) signal, at frequency $f_1$ to the ESL tag, and by having the ESL tag generate a reflected radio signal ($f_1 \pm f_2$) which has been modulated using a precise-frequency subcarrier signal $f_2$. The subcarrier signal itself is modulated using an uplink information signal. The ceiling node, of our illustrative ESL system, receives and detects the modulated reflected radio signal and uses a narrowband filter to retrieve the modulated subcarrier signal which is then demodulated to obtain the uplink information signal. According to one aspect of the invention, a crystal oscillator is divided-down to produce the precise subcarrier frequency. According to another aspect of the invention, a homodyne receiver is used to detect the modulated reflected radio signal which is narrowband filtered to obtain the modulated subcarrier signal.

BRIEF DESCRIPTION OF THE DRAWING

FIG. 2 shows the signals transmitted from the ceiling node and from an ESL tag.

DETAILED DESCRIPTION

Figure 1:
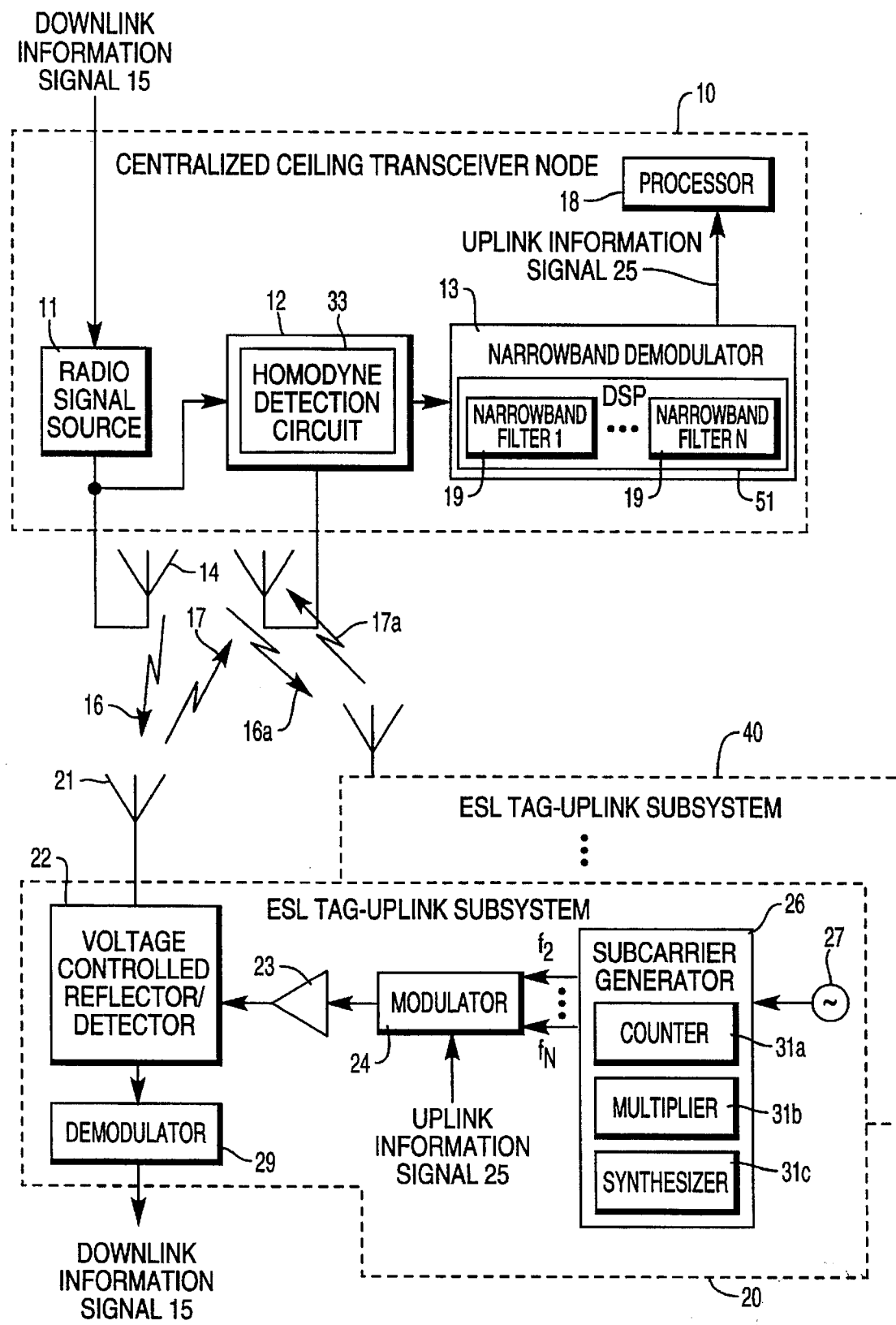
FIG. 1 shows a block diagram of an ESL system including a centralized ceiling node and a plurality of ESL tags.

FIG. 1 shows the details of ESL system components, including a centralized ceiling node 10 and a plurality of ESL tags 20–40. The centralized node 10 communicates with the plurality of ESL tags 20–40 over downlink and uplink paths, illustratively shown for ESL tag 20 as signaling paths 16 and 17. The present system operates similar to a backscatter radar system in that the ceiling node transmits a downlink radio signal 16 and looks for an uplink radio signal 17 that is a reflected version of the downlink radio signal 16.

Such modulated backscatter technology has been used to implement the uplink communications path in a number of applications similar to ESL systems to date. The most common use of this technology is to communicate with a vehicle tag as that vehicle passes through a toll collection station; the purpose of that communication is to electronically pay the toll of that vehicle without requiring the vehicle to slow down and pay a toll. Such a system (described in U.S. Pat. No. 4,075,632 issued Feb. 21, 1978 to H. W. Baldwin et al; U.S. Pat. No. 4,739,328 issued Apr. 19, 1988 to A. R. Koelle et al; and U.S. Pat. No. 4,786,907 issued Nov. 22, 1988 to A. R. Koelle) typically utilizes line-of-sight communications from the toll collection station to the vehicle tag. This system also utilizes directional antennas at the toll collection station to maximize the signal-to-noise ratio to obtain a reliable communications path. However, despite the use of these techniques, the effective range of these systems can be very limited, perhaps to as little as 10–20 feet from the toll collection station to the vehicle.

Unlike a vehicle tag, an ESL tag does not move at high-speed and thus does not require a high data transfer rate. However, ESL tags in a real supermarket typically do not always have a line-of-sight communications path with a central ceiling node (typically, a single ceiling node has to cover multiple supermarket aisles). In addition, the Federal Communications Commission regulates the amount of antenna gain allowable in the portions of radio spectrum in which ESL systems can legally operate. Thus, the traditional "tricks of the trade" (line-of-sight, directional antennas) to improve the signal-to-noise ratio in modulated backscatter systems are either not allowed or are impractical, due to the physical configuration of a real supermarket and government regulations. Therefore, the application of traditional vehicle-based modulated backscatter technology, which either does not utilize a subcarrier or which utilizes imprecise subcarrier frequencies, has a short communication range (for an acceptable signal-to-noise ratio). The result is that ESL systems utilizing prior art modulated backscatter technology would be economically impractical due to the large number of ceiling nodes that would be required.

With reference again to FIG. 1, the present invention solves the prior art problems using an ESL tag (e.g., 20) which modulates its reflection of the downlink radio signal 16 in a unique way to enable ceiling node 10 to easily detect and demodulate the uplink signal 17. The ESL tag 20 uses a crystal oscillator 27 which enables the generation (by subcarrier generator 26) of a precise subcarrier frequency to modulate the reflected uplink radio signal 17. This allows the use of narrowband modulation in the reflected uplink signal 17. At the ceiling node 10, the narrowband signal is readily narrowband filtered and demodulated, even in the presence of considerable levels of noise.

The following description references both FIGS. 1 and 2; the two-digit reference numbers refer to FIG. 1 while the three-digit reference numbers refer to FIG. 2.

In one application, an objective of the invention is to send a relatively low data rate signal over the modulated backscatter uplink communications channel. In modulated backscatter systems, a Continuous-Wave (CW) radio-frequency signal 201 (at frequency f1) is transmitted from the transceiver node 10 to the ESL tag 20. Conventionally, in the prior art, an information signal is mixed with the CW signal to form a modulated reflected signal 202, but still with this signal centered at frequency $f_1$. When this reflected signal returns to the transceiver node, homodyne detection is used which demodulates the modulated reflections of the CW signal 201. In accordance with the present invention, we have found that it is advantageous to move away from the noise by shifting the reflected signal away from the CW frequency $f_1$ by using a highly accurate subcarrier frequency $f_2$. The information to be sent from the ESL tag 20 to the ceiling transceiver node 10 is modulated onto the subcarrier frequency $f_2$ (by modulator 24), and then this modulated subcarrier signal is applied to a voltage-controlled reflector 22, thus producing a modulated reflected signal 17 at frequencies $(f_1 \pm f_2)$. Curve 210 shows one side of the frequency spectrum of the modulated reflected signal 17. When this modulated reflected signal returns to the transceiver node 10, homodyne detection eliminates the phase noise of the CW source 201 at frequency $f_1$. Then, the frequency $f_2$ must be enough above frequency $f_1$ such that the noise present in the homodyne receiver (shown as 204) is low compared to the signal strength of the modulated reflected signal 210 at $(f_1 \pm f_2)$ to ensure a good signal-to-noise ratio. Such noise is due primarily to 1/f noise generated in the receiver electronics, and clutter noise due to unwanted reflections by objects in the environment. The spectrum of the clutter component depends on the characteristics of the reflective objects; for example, as discussed below, many devices produce periodic reflections synchronous with the AC line frequency. The use of a precise-frequency subcarrier allows the use of very narrow filtering in the receiver which produces a significant reduction in the noise.

The present invention significantly improves the signal-to-noise ratio of modulated backscatter systems in the following way: In ceiling node 10, the radio signal source 11 transmits, via antenna 14, a continuous-wave (CW) single-frequency downlink signal 16 to the ESL tag 20. The ESL tag 20 modulates and backscatters the downlink signal 16. In ESL tag 20, the crystal reference oscillator 27 is an accurate frequency source which is used by a subcarrier generator 26 to generate one or more subcarrier frequencies based upon the reference frequency. Because of the use of a crystal reference oscillator 27, our subcarrier generator 26 is capable of generating a very precise subcarrier frequency (which could be as accurate as a fraction of a Hz). Subcarrier generator 26 may be a counter 31a which counts-down the frequency of crystal reference oscillator 27 to the desired one or more subcarrier frequencies (e.g., $f_2$). The subcarrier generator 26 may also be implemented as a frequency multiplier 31b which generates a frequency which is an integer multiple of the reference frequency, or as a cascade of multiplier 31b and counter 31a. Alternatively, it may be implemented as a frequency synthesizer 31c.

The modulator 24 uses the subcarrier frequency or frequencies (e.g., $f_2$) generated by the subcarrier generator 26 and modulates it using the uplink information signal 25 to produce a modulated signal. The modulated subcarrier signal is amplified by amplifier 23 and applied to voltage-controlled reflector 22. The voltage-controlled reflector 22 is used to modulate the modulated subcarrier signal onto the received CW frequency 16 on the antenna 21, thus producing a reflected signal 17 containing one or more pairs of sideband signals (e.g., modulated reflected signal 210) at precise frequencies (e.g., at $(f_1 \pm f_2)$) with respect to the CW signal $f_1$. These sideband signals are modulated with the uplink information signal using any conventional modulation technique such as phase shift keying or frequency shift keying. (In the event that only a single bit of information needs to be returned to the ceiling node, it could be represented by the presence or absence of a CW audio tone as the sideband signal at frequencies $(f_1 \pm f_2)$.)

When the uplink signal 17 is received by the ceiling node 10, the signal is detected using homodyne receiver 12 (as is commonly done in modulated backscatter systems). Homodyne receiver 12 includes homodyne detection circuit 33. Radio signal source 11 provides a reference signal (CW frequency $f_1$) to homodyne receiver 12. The output of homodyne receiver 12 is the modulated signal $f_2$ which is then demodulated in narrowband demodulator 13. The output of demodulator 13 is the original uplink information signal 25, from ESL tag 20, which is passed to processor 18 for processing.

According to the present invention, narrowband demodulator 13 uses narrowband filters 19 (bandwidth 220) to filter the modulated subcarrier signal $f_2$. This is possible because the modulated subcarrier signal $f_2$ has a very precise frequency $f_2$, due to the frequency accuracy of the crystal oscillator 27 of ESL tag 20. In such a situation, the bandwidth of narrowband filter 19 can be approximately the bandwidth of the uplink information signal 25. For example, where the uplink information signal 25 data rate is only a few bits per second, narrowband filters 19 on the order of a few Hz of bandwidth are possible.

These narrowband filters 19 could be implemented using standard analog filtering techniques or (more likely) would be implemented using well-known digital filtering techniques such as a programmable Digital Signal Processor (DSP) 51. This combination of using a crystal oscillator 27 (to generate a precise subcarrier frequency $f_2$) when modulated onto the incoming CW signal 16 (using the modulated precisely controlled subcarrier frequency) and then recovering the modulated backscatter signal 17 in the ceiling node 10 (using narrowband filtering techniques, such as a DSP) results in orders-of-magnitude improvement over present modulated backscatter systems. That is, satisfactory operation of the present system is obtained using a signal-to-noise (S/N) ratio which may be orders of magnitude worse than the operating S/N ratio of prior art systems. The reduced S/N requirements of the present invention make it economically feasible to develop an ESL system using a minimum number of ceiling nodes 10 which can reliably cover all the ESL tags 20–40 for an entire supermarket. This, in turn, allows the ESL tags 20–40 to transmit a reliable uplink signal (e.g., 17) indicating a successful price update. The reliability of this uplink transmission then assures the supermarket and its customers that the prices as displayed on the ESL tags are accurate with respect to the prices in the scanner databases. This set of capabilities is vital for an ESL system to meet the customer's expectations.

There are two ways in which the narrowband filters 19 in the narrowband demodulator 13 improve the signal-to-noise ratio: a) as is well known, less noise goes through a narrow filter 19; however, b) in the supermarket environment, the dominant source of noise is unwanted reflections (interference) from electrical and electronic equipment located in the vicinity. In particular, fluorescent lights are a serious, but not previously appreciated, offender. Noise from such devices tends to exhibit a "line" spectrum, where most of the noise energy is concentrated into narrow frequency bands or lines. Noise from fluorescent lights powered from an AC supply occurs in narrow frequency bands (e.g., 230 and 240) that are multiples of the AC frequency (60 Hz in the USA). By making the bandwidth 220 of the uplink signal much narrower than the spacing of such lines, it is possible to select the subcarrier frequency or frequencies such that those frequencies fall in between the noise lines 230 and 240, and far enough away from them such that the uplink signal avoids this type of noise frequencies altogether.

An alternative embodiment of the invention consists of using a well-known "comb" filter (as a narrowband filter 19) that selectively attenuates the spectral lines of the noise, followed by a receiver capable of demodulating the received signal even in the presence of the distortion caused by the comb filter. In this case, the use of a crystal oscillator in ESL tag 20 is still needed to achieve the frequency accuracy required to make the signal detectable in the presence of the above-mentioned distortion.

Well-known circuitry, as described in the previously referenced patents, for example, may be utilized to implement radio signal source 11, homodyne receiver 12, narrowband demodulator 13, filters 19, and processor 18 of ceiling node 10 as well as voltage controlled reflector 22, demodulator 29, amplifier 23, modulator 24, subcarrier generator 26, and crystal reference oscillator 27 of ESL tag 20.

While this invention is disclosed and described with reference to an ESL system, it should be obvious that the invention is relevant to any radio system utilizing modulated backscatter in which the objective is to extend the range of the uplink path (the path which is reflected and modulated by a device). Therefore, this invention is not limited to ESLs, or even limited to tag-like devices with displays (the existence of a display is not material to this invention), but rather applies broadly to the use of modulated backscatter systems.

Note that the use of narrowband signals in the uplink path does not adversely affect the system's overall uplink capacity because different ESL tags (e.g., 20 and 40) can be arranged to transmit simultaneously using different uplink-subcarrier subcarrier frequencies (e.g., $f_2$ and $f_3$ of FIG. 2). As long as these frequencies are separated 260 by more than the bandwidth 220 of the narrowband filters 19 used by demodulator 13 in the ceiling node 10, the individual signals from one ESL tag (i.e., 210 from ESL tag 20) will be demodulated without interference from the signal from another ESL tag (e.g., 270 from ESL tag 40). Through the use of digital signal processing (processor 18), the ceiling node 10 can simultaneously filter and demodulate a large number of uplink signals ($f_2$, $f_3$, etc.) occupying a large total bandwidth and providing a large aggregate uplink capacity.

The limited states of a narrowband uplink, i.e., absent or present, need not restrict uplink communications to two states. As in the game of "20 Questions", sequential uplinks can be used to convey complete information.

Instead of several ESL tags applying uplink signals at frequencies $f_2$, $f_3$... etc., respectively, it is also possible for one ESL tag to simultaneously respond on multiple uplink frequencies. In this way, the uplinks can be a multi-state symbol (e.g., a 4-bit symbol $f_2$, $f_3$, $f_4$, $f_5$) and more information can be conveyed in a given time period. Yet, these frequencies can be chosen to avoid the noise from fluorescent lights.

Finally, the ceiling receiver can listen to an uplink frequency $f_6$ that is close to other uplink frequencies; but $f_6$ is known to have no uplink signal present from any ESL tag. The uplink at $f_6$ thereby serves as a "noise" reference for establishing decision thresholds to detect if, for example, the uplink at $f_1$ is present. The hypothesis is that any interference would be wider in bandwidth and span the frequencies $f_1$ through $f_5$.

What has been described, then, is merely illustrative of the application of the principles of the present invention. Other arrangements and methods can be implemented by those skilled in the art without departing from the spirit and scope of the present invention.

We claim:
1. A radio communication system comprising
   a transceiver node including
   means for transmitting a radio signal, and
   a subsystem circuit including
   means for generating a precise-frequency subcarrier signal, having a frequency which lies between two integer multiples of an AC power-supply-line frequency,
   means for modulating said subcarrier signal with an information signal to produce a modulated subcarrier signal,
   means for varying a reflection of said radio signal in response to said modulated subcarrier signal to produce a modulated reflected radio signal,
   the transceiver node further including
   means for receiving and detecting said reflected radio signal to obtain said modulated subcarrier signal,
   narrowband filter means, including a digital signal and having a bandwidth this is less than the AC line frequency, for filtering said modulated subcarrier signal, and
   means for demodulating the modulated subcarrier signal to obtain said information signal.
2. The system of claim 1 wherein
   said generating means includes a crystal oscillator to obtain a precise-frequency subcarrier signal.
3. The system of claim 1 further including a counter means for counting down a crystal oscillator frequency to generate the precise-frequency subcarrier signal.
4. The system of claim 1 further including a multiplier means for multiplying a crystal oscillator frequency to generate the precise-frequency subcarrier signal.
5. The system of claim 1 further including a frequency synthesizer to generate the precise-frequency subcarrier signal from a crystal oscillator frequency.
6. The system of claim 1 further including both multiplier and counter means to generate the precise-frequency subcarrier signal from a crystal oscillator frequency.
7. The system of claim 1 wherein said receiving means includes a homodyne receiver for detecting said reflected radio signal to obtain said modulated subcarrier signal.
8. The system of claim 1 wherein
   said modulating means generates a modulated subcarrier signal having one or more sidebands.
9. The system of claim 1 wherein
   said modulating means modulates one of a plurality of subcarrier frequencies which are inputted thereto.
10. The system of claim 1 wherein
    said demodulating means includes a comb filter for filtering said modulated subcarrier signal.
11. The system of claim 10 wherein said comb filter means is adapted to demodulate and detect more than one sideband frequency.
12. The system of claim 1 wherein
    said demodulating means includes a digital signal processing means for filtering said modulated subcarrier signal.
13. The system of claim 12 wherein
    said digital signal processing means is adapted demodulate and detect more than one sideband frequency.

14. The system of claim 1 wherein said generating means generates more than one such subcarrier signal.

15. The system of claim 1 wherein the receiving means detects the signal strength at a frequency where no subcarrier is present.

16. A radio communication apparatus comprising means for transmitting a radio signal, means for receiving a reflected modulated version of said radio signal, said modulated radio signal modulated with an information-modulated subcarrier signal having a frequency which lies between two integer multiples of an AC power-supply-line frequency, narrowband filter means, including a digital signal processor and having a receive bandwidth which is less than the AC line frequency, for filtering said received modulated radio signal to obtain said information-modulated subcarrier signal, and means for demodulating said information-modulated subcarrier signal to obtain an information signal therefrom.

17. The apparatus of claim 16 wherein said receiving means includes a homodyne receiver.

18. The apparatus of claim 16 wherein said demodulating means includes a comb filter for filtering said received reflected radio signal.

19. The apparatus of claim 18 wherein said comb filter is adapted to demodulate and detect more than one sideband frequency.

20. The apparatus of claim 16 wherein said digital signal processing means is adapted to demodulate and detect more than one sideband frequency.

* * * * *

UNITED STATES PATENT AND TRADEMARK OFFICE
CERTIFICATE OF CORRECTION

PATENT NO. : 5,640,683
DATED : June 17, 1997
INVENTOR(S) : James G. Evans et al.

It is certified that error appears in the above-indentified patent and that said Letters Patent is hereby corrected as shown below:

Column 6, line 65, after "adapted" insert
--to--.

Signed and Sealed this

Twenty-fifth Day of April, 2000

*Attest:*

Q. TODD DICKINSON

*Attesting Officer*     *Director of Patents and Trademarks*